UNITED STATES PATENT OFFICE.

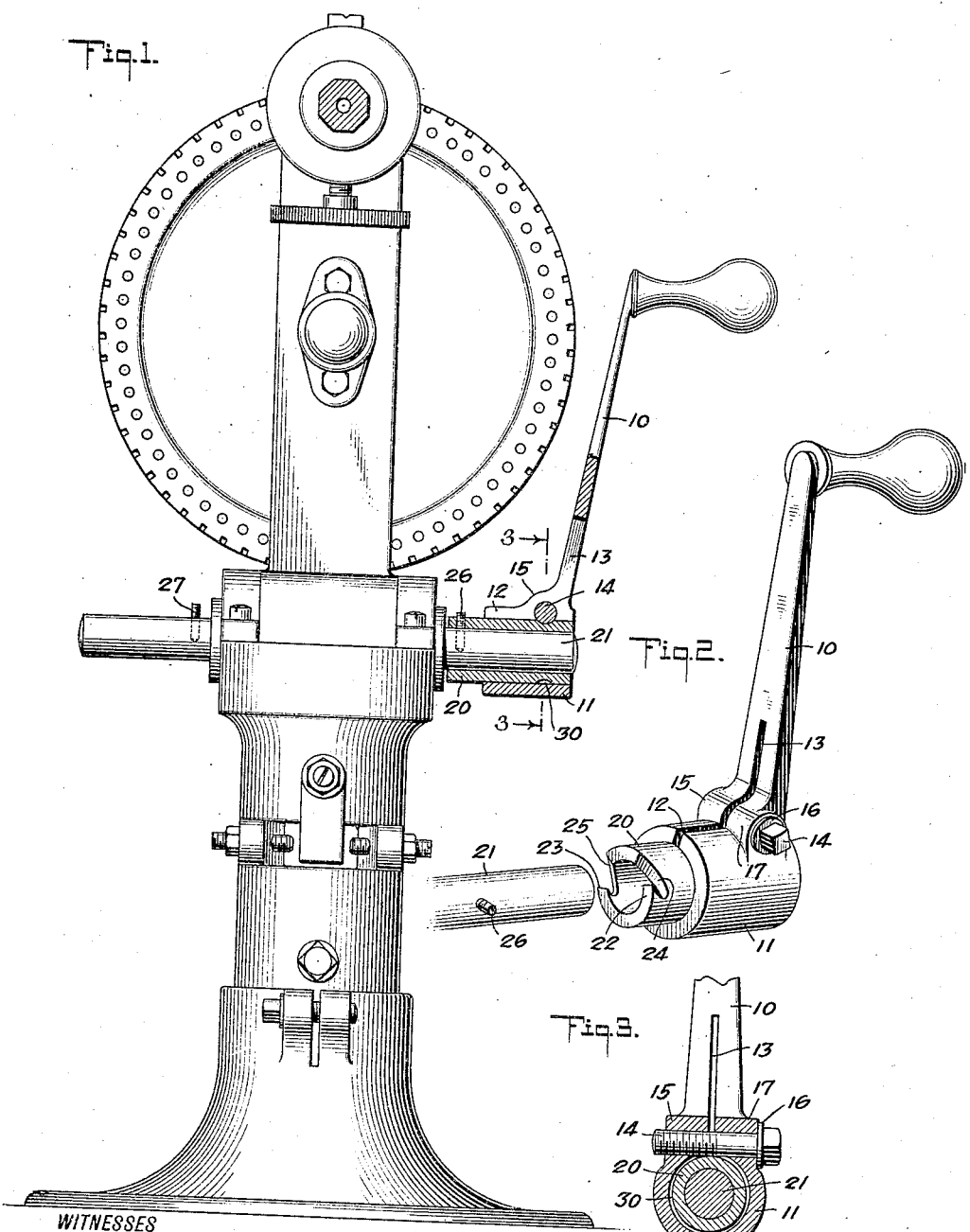

WILLIAM FREDERICK MANGELS, OF BROOKLYN, NEW YORK.

SLIP-CRANK.

1,306,603.  Specification of Letters Patent.  Patented June 10, 1919.

Original application filed April 2, 1918, Serial No. 226,222. Divided and this application filed June 8, 1918. Serial No. 239,023.

*To all whom it may concern:*

Be it known that I, WILLIAM F. MANGELS, a citizen of the United States, and a resident of the city of New York, Coney Island, borough of Brooklyn, in the county of Kings and State of New York, have invented a new and Improved Slip-Crank, of which the following is a full, clear, and exact description, this being a division of the application for Letters Patent for a machine-gun for shooting-galleries, Serial No. 226,222, filed by me April 2, 1918.

The object of the invention is to provide a new and improved slip crank arranged to prevent turning of the shaft in case of undue resistance against turning of the shaft. Another object is to permit the use of the slip crank on either end of the shaft.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a rear elevation of a machine gun provided with the slip crank;

Fig. 2 is a perspective view of the slip crank detached from the operating shaft; and Fig. 3 is a cross section of the same on the line 3—3 of Fig. 1.

The handle 10 of the slip crank is provided with a hub 11 having a lengthwise extending split 12 terminating in an extension 13 extending a distance on the handle 10, as plainly indicated in the drawings. A clamping screw 14 engages the hub 11 and extends across the split 12, one end of the screw 14 screwing into the split side 15 and the other end of the screw having a head 16 abutting against the outer face of the other split side 17. Thus when the screw 14 is turned in one direction, the sides 15 and 17 can be readily drawn toward each other, and when the screw 14 is turned in the opposite direction the split sides 15 and 17 are moved apart or into open position.

In the hub 11 fits a sleeve 20 adapted to engage either end of a shaft 21 to be turned by the slip crank. By the use of the screw 14 the sleeve 20 is clamped with more or less force in the hub 11 to normally hold the sleeve 20 against turning in the hub 11, but in case the resistance offered by the shaft 21 for turning it exceeds the frictional contact between the hub 11 and the sleeve 20 then the hub 11 turns on the sleeve 20 without the latter turning the shaft 21. By the arrangement described, the shaft is not turned by the operator manipulating the crank arm 10 in case the mechanism connected with the shaft 21 offers a larger resistance than that intended to prevent breaking or injury to such mechanism.

As shown in the drawings, the sleeve 20 projects beyond the inner end of the hub 11 and is provided at diametrically opposite sides with lips 22 and 23 to which lead cam faces 24 and 25, of which the cam face 24 and lip 22 are adapted to engage a pin 26 on one end of the shaft 21, and the lip 23 and its cam face 25 are adapted to engage a pin 27 on the other end of the shaft 21 with a view to turn the latter on turning the slip crank, as above explained.

By reference to Fig. 2 it will be noticed that the cam faces 24 and 25 extend toward each other on the same semicircular portion of the sleeve 20 to permit of applying the slip crank to either end of the shaft 21 for engagement with the corresponding pin 26 or 27.

In order to prevent the sleeve 20 from moving accidentally lengthwise in the hub 11, the sleeve is provided exteriorly with an annular groove 30 through which extends the clamping screw 14 thus holding the sleeve against lengthwise movement but allowing turning of the hub 11 relative to the sleeve 20, as previously explained.

Although the slip crank is shown in connection with the operating shaft of a machine gun for shooting galleries, it is expressly understood that I do not limit myself to this particular application, as the slip crank may be used on the shafts of spring motors and other devices and machines.

Having thus described my invention, I claim as new and desire to secure by Letters Patent:—

1. In a slip crank, a handle provided with a tubular slip member adapted to be engaged with either end of a shaft to be turned, the said member being provided with lips disposed approximately diametrically opposite each other, and cam faces on the sleeve extending from the said lips toward each other.

2. A slip crank, comprising a split hub having a handle, a clamping screw screwing in the hub and extending across the split to move the split sides toward each other, a sleeve mounted in the hub and normally bound in place by frictional contact with the said hub, the sleeve being adapted to fit either end of a shaft to be turned, the sleeve being provided with oppositely disposed lips and with cam faces extending from the said lips toward each other, the corresponding cam faces and lips being adapted to engage pins on the ends of the shaft to be turned.

WILLIAM FREDERICK MANGELS.

Copies of this patent may be obtained for five cents each, by addressing the "Commissioner of Patents, Washington, D. C."